United States Patent
Cao et al.

(10) Patent No.: US 11,823,118 B1
(45) Date of Patent: Nov. 21, 2023

(54) MODELS FOR EARLY DETECTION OF DELIVERY DEFECTS—UNASSIGNED DELIVERY BLOCKS

(71) Applicant: Amazon Technologies, Inc., Seattle, WA (US)

(72) Inventors: Zhiyuan Cao, Los Angeles, CA (US); Minghao Gai, Kirkland, WA (US); Leah Autumn Thompkins, Seattle, WA (US); Arun Kumar Galba, Lake Stevens, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/360,826

(22) Filed: Jun. 28, 2021

(51) Int. Cl.
| | |
|---|---|
| *G06Q 10/08* | (2023.01) |
| *G06Q 30/06* | (2023.01) |
| *G06Q 10/0835* | (2023.01) |
| *G06Q 10/0834* | (2023.01) |
| *G06Q 20/40* | (2012.01) |
| *G06Q 40/02* | (2023.01) |
| *G06Q 10/0639* | (2023.01) |
| *G06Q 10/0631* | (2023.01) |
| *G06N 7/01* | (2023.01) |

(52) U.S. Cl.
CPC ......... *G06Q 10/08355* (2013.01); *G06N 7/01* (2023.01); *G06Q 10/06398* (2013.01); *G06Q 10/063114* (2013.01); *G06Q 10/08345* (2013.01); *G06Q 20/4015* (2020.05); *G06Q 40/02* (2013.01)

(58) Field of Classification Search
CPC .............. G06Q 10/08; G06Q 30/06
USPC .......................................... 705/7.15
See application file for complete search history.

(56) References Cited

U.S. PATENT DOCUMENTS

| | | |
|---|---|---|
| 10,133,995 B1 | 11/2018 | Reiss et al. |
| 10,860,968 B1 | 12/2020 | Iacono et al. |
| 11,488,275 B2 | 11/2022 | Lee et al. |
| 2005/0071247 A1 | 3/2005 | Kelley et al. |
| 2008/0221727 A1* | 9/2008 | Walls ................. G06Q 10/0832 700/226 |
| 2011/0300894 A1 | 12/2011 | Roberts, Sr. et al. |

(Continued)

OTHER PUBLICATIONS

Alam, "k-Nearest Neighbors (kNN) for anomaly detection", retrieved on Dec. 10, 2020 at <<https://towardsdatascience.com/k-nearest-neighbors-knn-for-anomaly-detection-fdf8ee160d13>>, Towards Data Science, pp. 1-9.

(Continued)

*Primary Examiner* — Nga B Nguyen
(74) *Attorney, Agent, or Firm* — Lee & Hayes, P.C.

(57) ABSTRACT

A logistics system for managing a network of independent delivery partners may include models to detect delivery defects. The models may generate defect scores for each onboarded delivery partner. The system may collect delivery data to continuously update the models. The updated models may score delivery partners for early detection of delivery defects and determine remediations steps. The system may train one or more models to determine the scores based on a terminating step of the delivery steps. The scores may indicate a likelihood the terminating step was caused by intentional action or by accident. The system may determine remediations steps based on the likelihood of intentional action.

20 Claims, 7 Drawing Sheets

(56) References Cited

U.S. PATENT DOCUMENTS

| | | | |
|---|---|---|---|
| 2014/0025524 A1* | 1/2014 | Sims | G06Q 30/0639 |
| | | | 705/330 |
| 2015/0051964 A1 | 2/2015 | Hunt | |
| 2015/0142594 A1* | 5/2015 | Lutnick | G06Q 30/08 |
| | | | 705/26.81 |
| 2015/0186869 A1* | 7/2015 | Winters | G06Q 50/28 |
| | | | 705/26.81 |
| 2015/0278759 A1* | 10/2015 | Harris | G06Q 10/08355 |
| | | | 705/338 |
| 2016/0171439 A1* | 6/2016 | Ladden | G06T 7/0004 |
| | | | 705/340 |
| 2018/0025407 A1 | 1/2018 | Zhang et al. | |
| 2018/0191643 A1 | 7/2018 | Berry et al. | |
| 2018/0211170 A1 | 7/2018 | Domnick | |
| 2019/0196502 A1 | 6/2019 | Arena et al. | |
| 2019/0287066 A1 | 9/2019 | Kellaway, Jr. et al. | |
| 2019/0295091 A1 | 9/2019 | Vandezande et al. | |
| 2020/0342387 A1 | 10/2020 | Rajkhowa et al. | |

OTHER PUBLICATIONS

CNBC, "What It's Like to Be an Amazon Flex Delivery Driver", Jun. 19, 2019, <<https://www.youtube.com/watch?v=TlcP2aTOp-Q>>, 4 pages.

Gig Nation, "How to Use the Amazon Flex App Step by Step & Ride Along 2019", Jul. 24, 2019, <<https://www.youtube.com/watch?v=xG77nQUiuRQ>>, 2 pages.

Office Action for U.S. Appl. No. 17/360,871, dated Jan. 18, 2023, Chengeng Zeng, "Models for Early Detection of Delivery Defects—Expired Delivery Blocks", 39 pages.

Wallenstein et al.; "The New Freelancers: Tapping Talent in the Gig Economy"; published Jan. 17, 2019, accessed as of Aug. 15, 2020; u Boston Consulting Group; pp. 1-18; https://www.bcg.com/publications/2019/new-freelancers-tapping-talent-gig-economy (Year: 2020).

* cited by examiner

MODELS FOR EARLY DETECTION OF DELIVERY DEFECTS—UNASSIGNED DELIVERY BLOCKS

BACKGROUND

Due to the increased demand for same-day or overnight shipping for online shopping and perishable items, vendors may need to rely on multiple carriers to meet the demand and maintain timeliness. A large vendor may use both third-party and in-house delivery services as the primary carriers but still have service gaps due to unexpected surge or off-hour needs. For instance, the large vendor may experience delivery surges on holidays, weekends, or sales events and may need to rapidly increase the number of delivery drivers for a short period of time. In some populated urban areas, the large vendor may add freelance delivery drivers to their logistics system to fill in these service gaps and nimbly respond to spikes. By adding freelance delivery drivers to their delivery team, the large vendor may increase the flexibility of their delivery service and access a large network of delivery drivers when needed. In return, by adding freelance delivery drivers, the drivers may increase the flexibility of their work schedule and access a network for extra income when needed.

Although the freelance delivery drivers may provide the manpower needed to help meet the service demands, not all freelance delivery drivers are equally knowledgeable, equipped, and/or able to maintain the same delivery standard and timeliness that customers may be accustomed to and expect from the vendor. A delivery service defect, caused either accidentally or intentionally by a freelance delivery driver, may result in costly customer service compensations and/or damage to the vendor's reputation. Accordingly, there is an ongoing need for increased quality control for a logistics management system that is nimble and robust enough to manage a network of freelance delivery drivers.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
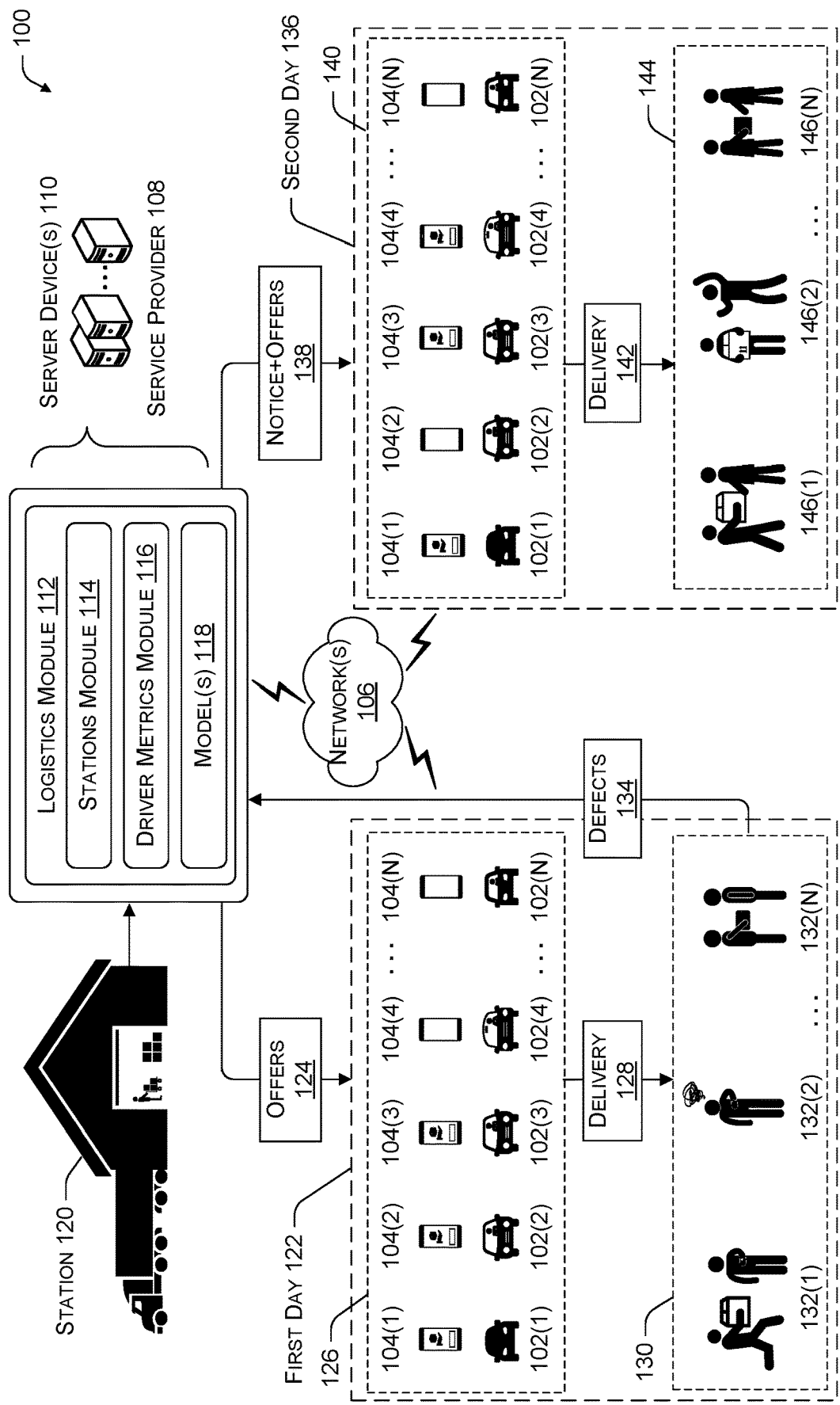
FIG. 1 is a schematic diagram showing an example system including models to detect and mitigate delivery service defects.

This disclosure is directed, in part, to a logistics system that includes generating models to score delivery partners for early detection of delivery defects and determine remediations steps. A service provider with a delivery service team may include the logistics system to help manage a network of independent delivery partners. It is understood in the context of this document that the techniques discussed herein may also be implemented in other logistics or scheduling technologies and not specific to delivery partners. A delivery partner may include any local user with access to a vehicle who registers to receive offers to work "delivery blocks" as part of the network of independent delivery partners. The system may include a driver portal for the user to create a user account ("driver account") and self-onboard as a freelance driver ("delivery partner," "user," or "driver").

The system may include a network of delivery stations and may schedule delivery blocks for the stations. A delivery station may receive a shipment of orders to be delivered, and the system may create optimized routes and maps for the orders. The system may group orders by routes based on destinations and estimated delivery time (e.g., 2 hours total, 3 hours total, etc.). The system may determine a schedule for each delivery route, including an approximate start time and end time. The system may generate offers for delivery blocks based on the delivery routes. Each delivery block may include a starting location (e.g., a station address, a grocery store address, etc.), an expected start time, an expected total delivery time to complete the block, and payment for the block. The delivery partners may view and reserve offers for one or more delivery blocks as long as the start time and end time of the blocks do not overlap.

In some examples, the system may use station data and order data as input for a predictive model to estimate the number of delivery blocks. The number of delivery blocks may, at minimum, be the same as the number of delivery routes. In various examples, to ensure timeliness for all delivery routes, the system and/or the stations may intentionally "overbook" for large shipments. The overbooking may be based on estimating the number of delivery blocks is greater than the number of delivery routes by some percent to account for delivery partners that may not show up for their reserved blocks and to account for potential human and/or device errors. The system may post offers for the delivery blocks. An onboarded delivery partner may accept an offer and reserve an offer for a delivery block and may release the reservation before the system acknowledges the reservation.

In various examples, due to the station intentionally overbooking, the number of delivery partners who check-in for their delivery blocks may be greater than the number of routes available for assignment at that station, which creates a delivery defect. A delivery defect is created when a delivery partner successfully completes a check-in event but subsequently fails to complete an assigned delivery route. Because the delivery defect may be created by the system and/or by a station using the system, the system will credit the delivery payment for the block to the delivery partner who successfully completes the check-in event. In the interest of balancing overbooking with timeliness, the system may continuously analyze delivery data to minimize and/or mitigate delivery defects. In some examples, the system may process delivery data periodically (e.g., daily, every other day, weekly) to generate updated predictive models. The system may detect different types of delivery defects based on a terminating step and may generate different analysis models to suggest different solutions based on the defect.

The system may determine that the first type of delivery defect occurs when a delivery partner successfully completes a check-in event but fails to receive an assignment during their time block. This first type of delivery defect is referred to as an Unassigned Delivery Block (UDB) defect. As described herein, a UDB defect may be caused by a station overbooking for a shipment of orders by offering more delivery blocks than delivery routes and/or a surplus number of delivery partners confirming for delivery before the start of the delivery blocks. Accordingly, the system will increase a UDB count for the station and for the partner(s) who did not receive an assignment. The UDB probability score model may include the UDB count for the station when evaluating the partner(s) score.

Although a portion of the delivery defects may be intentionally caused by the system, the delivery defects may also be caused by the delivery partners. To avoid causing a delivery defect, a delivery partner has to successfully complete all the steps for an assigned delivery route. The system may consider a number of steps to complete the route. For instance, the delivery partner has to: (1) accept the offer for a delivery block and complete a check-in event at the starting location before a start time of the block; (2) receive an offer for a route assignment for the block and accept the offer before the offer timer expires, (3) complete a pick-up event for block and receive the packages for the route, and (4) complete delivery for all orders/packages on the route and/or block. As described above, terminating after the first step is an Unassigned Delivery Block (UDB) defect. In additional examples, terminating after the second step is an Expired Delivery Block (EDB) defect, and terminating after the third step is an Ignored Delivery Block (IDB) defect. In a non-limiting example: (1) a UDB defect occurs when a driver checks in at the station but never receives an assignment for the block; (2) an EDB defect occurs when the driver checks in and receives an assignment for the block but then the driver allows an assignment timer to expire without accepting assignment for the block; and (3) an IDB defect occurs when the driver accepts assignment but "ignores" or does not pick up the order for the block. In some instances, a delivery partner may successfully complete more than the first step, thus avoiding a UDB defect, but failed to complete the remaining steps due to a number of reasons.

In various examples, the system may analyze delivery data to identify the delivery defects and help address the cause of the defects. The present system manages a network of freelance drivers who sign up for blocks of delivery work that are in addition to other employment that the freelance drivers may have, which means this may not be a routine event for a newly onboarded driver; thus, human error can and will happen. Even for the more experienced delivery partner, if they move to a different area, traveling to a new station may create a situation where the delivery partner is unable to find the new station, or has difficulty navigating to the new station. Additionally, the delivery partner may be an independent user who provides their own phone and their own vehicle, both of which could fail at an inopportune time. Accordingly, the system may determine a predetermined number of unintended delivery defects that are acceptable based on a total delivery defect count of the delivery partner. Additionally, the system may determine a threshold number for intended delivery defects that, if exceeded, is deemed excessive and may flag user accounts for fraudulent activities. In some examples, because a delivery partner is compensated for their time in the event of some delivery defects, some fraudulent users may sign up for user accounts and create delivery defects without intending to complete the delivery route. A delivery defect, whether it was intentionally caused by a fraudulent user or accidentally caused by a well-intentioned delivery partner, may cause delays in delivery because the system has to find and reassign the route to another driver. Furthermore, if an unassigned driver is not already present at the station, the delivery may be further delayed. Accordingly, to improve service quality, the system needs to be able to quickly identify the fraudulent users to offboard them and identify the well-intentioned delivery partners to provide additional guidance or instructions. In some examples, due to the short time frame of delivery blocks (e.g., 2 hours), an experienced delivery partner may not wish to be inundated with advanced notifications and/or additional instructions. Thus, under normal conditions, the system may release reserved delivery block instructions a short period of time before the block start time (e.g., 2 hours before start time).

The present logistics system may generate one or more machine learning models to determine scores for delivery partners to allow early detection of delivery defects. In some examples, the system may analyze stored delivery data to determine metrics for delivery stations and delivery partners. The metrics may be used to generate models to determine probabilities for delivery defects.

In additional examples, the system may identify a terminating step of the delivery defect and determine a defect score to evaluate whether the terminating step was an intended action by the driver. The system may generate predictive models to score defects for a particular terminating step. As will be described herein in greater detail, the system may use both historical data and periodically (e.g., daily, weekly) updated delivery data to train and use Unassigned Delivery Block (UDB) probability score models for UDB defects and Expired Delivery Block (EDB) models for EDB defects. These updated trained models may output scores that include recently onboarded drivers to provide accurate indications of a likelihood of accidental or intentional defects for each driver. By using these continuously updated models, the system may flag delivery partners that are struggling to receive additional instructions and/or notifications to help improve retention rate.

In various examples, the system may continuously learn from new data to improve the predictive models and improve the service level. The system may also use the models to determine driver metrics and determine to provide improved offers to delivery partners with metrics correlated with high reliability. The improved offers may include orders that are more time-sensitive (e.g., a same day delivery order placed near end of day) but has a better pay rate for the delivery. In some examples, high-reliability delivery partners may be allowed to select preferred stations, and offers to for the preferred stations may be transmitted to the high-reliability delivery partners.

This logistics system provides a number of advantages over the traditional logistics systems, such as adding independent drivers to the third-party or in-house carriers and allowing earlier detection of delivery defects for each independent driver that are onboarded to the system. This system may be used to identify the probability of fraudulent behaviors for a large network of independent drivers across a network of delivery stations and quickly flag the driver(s) instead of waiting for a high occurrence of delivery defects which causes delays in delivery time, thus saving time and resources for the delivery stations and the customers waiting for the deliveries. Additionally, in situations where the driver is newly onboarded, the system may determine if the driver needs additional instructions and/or notifications to increase the efficiency of deliveries and possibly increase the retention rate for delivery partners.

Moreover, by creating a system that can detect delivery defects earlier and timely provide suggestions to mitigate the defect, delivery time and quality may be improved. The system may use daily delivery data to generate updated predictive models and to update the probability for defects for each driver and each station daily. Thus, the present logistics system provides improvement over traditional logistics systems by providing a faster, more efficient, and less costly method to manage a large network of independent delivery partners by not only identifying fraudulent activities but also identifying areas for improvement for delivery partners and stations. Additionally, the system may determine to offboard fraudulent users to avoid searching for a replacement driver and transmit additional offers to further optimize network traffic. These and other improvements to the functioning of a computer and network are discussed herein.

The techniques and systems described herein may be implemented in a number of ways. Example implementations are provided below with reference to the following figures.

FIG. 1 is a schematic diagram showing an example system 100 including models to detect and mitigate delivery service defects. The system 100 may include user(s) 102(1)-102(N) (individually and/or collectively referred to herein with reference 102) that utilizes device(s) 104(1)-104(N) (individually and/or collectively referred to herein with reference 104), through one or more network(s) 106, to interact with a service provider 108. In some examples, the network(s) 106 may be any type of network known in the art, such as the Internet. Moreover, the service provider 108 and/or the device(s) 104 may be communicatively coupled to the network(s) 106 in any manner, such as by a wired or wireless connection.

The user(s) 102 may use the device(s) 104 to interact with the service provider 108. In various examples, the user(s) 102 may include any individuals or entities with access to a suitable delivery vehicle (e.g., a car, truck, bicycle, motorcycle, moped, unmanned aerial vehicle (UAV), etc.) operating the device(s) 104. The user(s) 102 may, via the device(s) 104, register for a user account to be included in a network of independent delivery partners managed by the service provider 108. In some examples, the user(s) 102 may include entities such as self-managing delivery service groups working under one or more user accounts associated with an umbrella entity-user account.

The user(s) 102 (e.g., a driver, a member of an entity, etc.) may interact with the service provider 108 via a website, a service provider application, a third-party application, a user interface, a user portal, or in any other manner. The user(s) 102 may interact with the service provider 108 to view offers for delivery blocks. The logistics module 112 may present offers and notifications via user interfaces to prompt the user(s) 102. Each delivery block may correspond to a period of time (e.g., an hour, two hours, etc.) in which a delivery partner or user 102 is to deliver packages (e.g., boxes, bags, envelopes, etc.) to delivery destinations on behalf of the service provider 108. For instance, the service provider 108 may receive orders from customers, identify the items included in the orders, and facilitate delivery of the items using the users 102.

In some examples, the user(s) 102 may operate the corresponding device(s) 104 to perform various functions associated with the device(s) 104, which may include at least some of the operations and/or modules discussed below with respect to the server device(s) 110. The user(s) 102 may operate the device(s) 104 using any input/output devices, including but not limited to mouse, monitors, displays, augmented glasses, keyboard, cameras, microphones, speakers, and headsets.

The service provider 108 may be any vendor, entity, delivery service, server(s), platform, etc., that manages any type of logistics system with independent delivery partners, including the user(s) 102. In some examples, the service provider 108 may provide websites or apps for the user(s) 102 to register for a user account and receive offers from the service provider 108. The service provider 108 may provide user portals for the user(s) 102 to interact with the logistics system and upload information (e.g., scanning orders, photos of delivered orders, etc.). In various examples, the service provider 108 may include one or more delivery stations (e.g., delivery station 120) to receive and/or process orders for delivery. As shown, the service provider 108 may include one or more server device(s) 110. Also as shown, the one or more server device(s) 110 may be running locally at a delivery station (e.g., delivery station 120) and/or as part of a network-accessible server. The server device(s) 110 may be implemented in a non-distributed computing environment or may be implemented in a distributed computing environment, possibly by running one or more modules on the device(s) 104 or other remotely located devices. The server device(s) 110 may be any type of server, such as a network-accessible server.

In various examples, the service provider 108 may present the offers for delivery blocks on behalf of the service provider 108, delivery services, and/or entities. In at least one example, the service provider 108 described herein may cause one or more user interfaces to be presented to user(s) 102 via device(s) 104. The user interface(s) may allow the user(s) 102 to create user accounts to access and interact with the system, among other possible uses.

In at least one configuration, the server device(s) 110 may include any components that may be used to facilitate interaction between the service provider 108 and the device(s) 104. For example, the server device(s) 110 may include a logistics module 112 and associated components.

The logistics module 112 may include the stations module 114, the driver metrics module 116, and the model(s) 118. The logistics module 112 may manage a network of independent delivery partners by allowing the user(s) 102 to self-onboard with user accounts and continuously monitor and update metrics for the user accounts. The logistics module 112 may interact with device(s) 104 and allow the user(s) 102 to reserve offers for blocks. The logistics module 112 and associated components may generate user interfaces to prompt and guide the user(s) 102 to perform steps to complete a delivery route. For the purpose of this discussion, such user interfaces are referred to herein as a "driver portal UI." Additionally, for the purpose of this discussion, references to actions taken by the user(s) 102 may be based on receiving user input via the device(s) 104 and may be associated with a corresponding user account. In some examples, the logistics module 112 may generate the driver portal UI to display instructions associated with a current delivery step for the user(s) 102 to guide the completion of each delivery step. The instructions may include directing the user(s) 102 to drive from one location to another, including instructions to drive to a starting location to receive further instructions. The driver portal UI may allow the user(s) 102, via the device(s) 104, to provide user input for reservations for offers for blocks, acceptance of offers, confirmation for check-in location, and confirmation for step complete, and may display instructions to receive orders, as illustrated and discussed in FIGS. 3 and 4, below. Although not illustrated, the driver portal UI may include instructions to scan packages and/or take photos of the packages.

The stations module 114 may receive shipment data associated with orders and process the orders for a station. The shipment data may include data for a shipment that arrived at the station may be processed into orders to be delivered from the station. In some examples, the stations module 114 may receive and process the shipment data ahead of receiving shipment to schedule offers for delivery blocks. The stations module 114 may create optimized routes by grouping orders based on delivery areas. The stations module 114 may determine an estimated delivery time and limit the optimized routes to a maximum delivery block time. The maximum delivery block time is any reasonable length of work time (e.g., 2 hours total, 3 hours total, etc.). The stations module 114 may determine the maximum delivery block time based on regional traffic conditions. For instance, a smaller well-planned city may need only 2 hours for a delivery, while a larger less well-planned city may need 3 hours for the same delivery. The stations module 114 may determine a schedule for each delivery route, including an approximate start time and end time, and generate delivery blocks based on the delivery routes. The stations module 114 may generate delivery blocks to include a starting location (e.g., address for the station 120), an expected start time, an expected total delivery block time to complete the block, and payment for the block. The stations module 114 may determine the capacity of the station and determine to stagger the start time for the blocks to avoid too many drivers arriving at the same time.

In some examples, the stations module 114 may use delivery data from one or more data sources as input for predictive models (e.g., the model(s) 118). The data source may include a database for the station 120, database for all stations associated with the service provider, and/or one or more databases associated with third-party logistics application(s). The stations module 114 may use a predictive model to estimate the number of delivery blocks for the delivery routes. The number of delivery blocks may, at minimum, be the same as the number of delivery routes. To ensure timeliness for all delivery routes, the stations module 114 may intentionally "overbook" for large shipments by estimating the number of delivery blocks that is greater than the number of delivery routes to account for a percentage of delivery partners that may not show up for their blocks. In some examples, the stations module 114, using the predictive model, may decrease the percentage of intentional overbooking for more well established stations with more experienced delivery partners. The stations module 114 may transmit offers for the delivery blocks to the driver portal. The stations module 114 may receive reservations for the offers for the delivery blocks. The number of reservations may be equal to the number overbooked by the stations module 114. Accordingly, at the starting time, if all drivers show up, the station would receive the same number of onsite confirmations as the number of delivery blocks. Since the number of delivery routes is less than the number of delivery blocks, the stations module 114 may determine route assignments for a portion of the onsite confirmed user devices. In some examples, the stations module 114 may assign the routes based on an order of arrival of delivery partners at the station. After the stations module 114 assigns all available delivery routes, the number of overbooked users remain. The stations module 114 may determine an Unassigned Delivery Block (UDB) event occurred. After a predetermined wait time has lapsed, if there are no expired blocks or ignored blocks, the stations module 114 may transmit messages for the remaining users with UDB that they are free to leave and credit each user account the block payment. In some examples, the stations module 114 may set the predetermined wait time based on an estimated time for block assignment completions (e.g., 30 minutes, 45 minutes) and the predetermined wait time may be equal to or less than the expected total delivery block time. For each of the remaining unassigned users, the UDB count associated with the user account increases by one. Additionally, the UDB count for the station 120 increases, including a UDB event count, where all the users equal one increase, and a UDB total count may increase by the number of unassigned users.

The driver metrics module 116 may generate and store user account data in a database. Initially, the driver metrics module 116 may receive data specific to driver static information from the user(s) 102 when creating a new user account and store account data in a database. The database may be a local database and/or a networked database to share information across stations. The data may include driver license, tax identification code, insurance, financial institute, onboard location, and the like.

The driver metrics module 116 may maintain user account data. The user account data may include driver metrics, delivery records, and delivery metrics (e.g., late delivery, delivered and received (DAR), delivered not received (DNR), delivery completion rate (DCR)). The driver metrics module 116 may occasionally purge inactive accounts if the account was never activated. The driver metrics module 116 may determine based on the user account data whether a present account should be active, flagged, or offboarded. An offboarded account is an account that has been removed, and/or otherwise has network access privilege revoked, from the network of delivery partners, usually due to high indication of fraudulent activities (e.g., 100% delivery defects for 10 or more consecutive blocks). As described herein, the system may determine fraudulent activities by an excessive number and/or patterns of intentional defects. In some instances, an offboarded account may be reinstated following appeal and investigation, but extenuating circumstances aside (e.g., proof of user account hack), the chances of reinstatement are low. If an account becomes inactive due to enforcement actions against intentional fraudulent behavior, the driver metrics module 116 may store the account data for at least a predetermined length of time. In some instances, if the driver metrics module 116 determines the driver license has expired, the user account may be flagged until an updated license is uploaded.

The driver metrics module 116 may receive and analyze delivery data to update metrics for user accounts mentioned in the delivery data. In some examples, the driver metrics module 116 may receive and parse delivery data from a database or additional data source (e.g., data from a third-party delivery application) for additional data, including metrics and/or features that may influence a delivery service level of a driver. For instance, the metrics and/or features may include data specific to a routes/blocks (e.g., block time information and a number of orders in the block); data specific to the station 120 (e.g., station size and station age); and data specific to the driver performance history (e.g., lifetime block count and Expired Delivery Block (EDB) count in the last 14 days).

The model(s) 118 may use training data to generate one or more models. The model(s) 118 may use data associated with a station and/or the user accounts as training data.

In some examples, the model(s) 118 may generate a model to estimate a number of offers needed to cover a number of delivery routes. In various examples, the stations module 114 may use delivery data from one or more data sources as input data for the model(s) 118. The stations module 114 may call the model(s) 118 to generate a predictive model to estimate the number of delivery blocks for the delivery routes. For small shipments with few orders, the model(s) 118 may determine a number of delivery blocks are the same as the number of delivery routes. For large shipment, the model(s) 118 may determine, using historical data associated with the station 120, a percentage of delivery partners that did not show up for their reserved blocks and/or the percentage of delivery partners that did not complete the delivery route for their reserved blocks. The model(s) 118 may use the percentage to determine an estimated number of delivery blocks needed to complete a current number of routes, and the stations module 114 may transmit offers for the estimated number of delivery blocks to the driver portal. In some examples, the logistics module 112 and the model(s) 118 may determine to provide advance notifications of offers.

The model(s) 118 may receive delivery data and generate defect-specific probability score models. The model(s) 118 may receive updated delivery data periodically (e.g., daily, weekly) and may generate updated defect-specific probability score models. As will be described in greater detail with respect to FIG. 2, the model(s) 118 may generate an Unassigned Delivery Block (UDB) probability score model to determine UDB scores and generate Expired Delivery Block (EDB) models to determine EDB scores for the user(s) 102.

As a non-limiting example, the example system 100 may illustrate an exemplary process of the logistics module 112 scheduling delivery blocks, for an example first day, receiving delivery data including defects, and applying models to delivery data to improve on an example second day.

In an example first day 122, the station 120 may receive a shipment of orders for delivery. The logistics module 112 may use the model(s) 118 to generate example offers 124 for an example pool of onboarded partners 126. In some examples, although all onboarded partners 126 may be able to view the example offers 124, there were a limited number of offers, and only the users 102(1), 102(2), and 102(3) were able to reserve the offers before the blocks were all reserves. Subsequently, the users 102(1), 102(2), and 102(3) provide the example delivery 128 for the example orders 130. In the present example, the user 102(1) was late but completed delivery for the example route 132(1), the user 102(2) failed to complete delivery the example route 132(2), and the user 102(3) completed delivery for the example route 132(N). The example delivery data 134, including defects data, was received by the logistics module 112.

Following the completion of the example first day 122, the models(s) 118 may use the example delivery data including example delivery data 134 including defects to generate predictive models to determine defect scores for the users 102(1), 102(2), and 102(3). The driver metrics module 116 may update the driver metrics for the users 102(1), 102(2), and 102(3). The models(s) 118 may determine the user 102(2) has accumulated a number of delivery defects count and flagged the account for analysis. The stations module 114 may also determine to send advanced notifications for the user 102(1) after accepting an offer based on the driver metrics indicating a recently onboarded status and delivery metrics indicating late delivery.

In an example second day 136, which may be any number of days subsequent to the example first day 122, the station 120 may receive another shipment of orders for delivery. The logistics module 112 may use the model(s) 118 to generate example offers 138 and second out notifications for the offers to an example pool of onboarded partners 140. In this example, although all onboarded partners 140 except flagged user 102(2) may be able to view the example offers 138, there were a limited number of offers, and only the users 102(1), 102(2), and 102(3) were able to reserve the offers before the blocks were all reserves. Subsequently, the users 102(1), 102(3), and 102(4) provide the example delivery 142 for the example orders 144. In this present example, the users 102(1), 102(3), and 102(4) completed their delivery for the example routes 146(1), 146(2), and 146(N).

As illustrated in the present example, the logistics module 112 provides an improvement over traditional logistics system by training model(s) 118 based on historical delivery data (e.g., example delivery data 134 including defects data), to detect delivery defects earlier and timely provide suggestions to mitigate the defects. In some examples, if the system determines the user(s) 102 could use a bit more guidance, the logistics module 112 may send emails with detailed instructions ahead of a default notification time so the users 102 may be better prepared to arrive at the station 120 on time and complete delivery on time. For instance, the system may send by default via the drive portal details for a work block 2-hours ahead of a block start time, but a newly onboarded user seems to always arrive last or late. To help guide this newly onboarded user, the system may determine to email details for the work block one day ahead with additional instructions, including an address of where to go and how to check-in. Additionally, the logistics module 112 flagged the user 102(2) for analysis, so the user 102(2) needs to review additional instructions or receive guidance before receiving more offers. To be flagged, the present system has determined that the user 102(2) has already caused multiple delivery defects and has a high likelihood of causing additional defects. Therefore, by removing this additional defect, the system reduces computational requirements because the system can avoid searching for a replacement driver and transmitting additional offers, which further optimizes network traffic.

Figure 2:
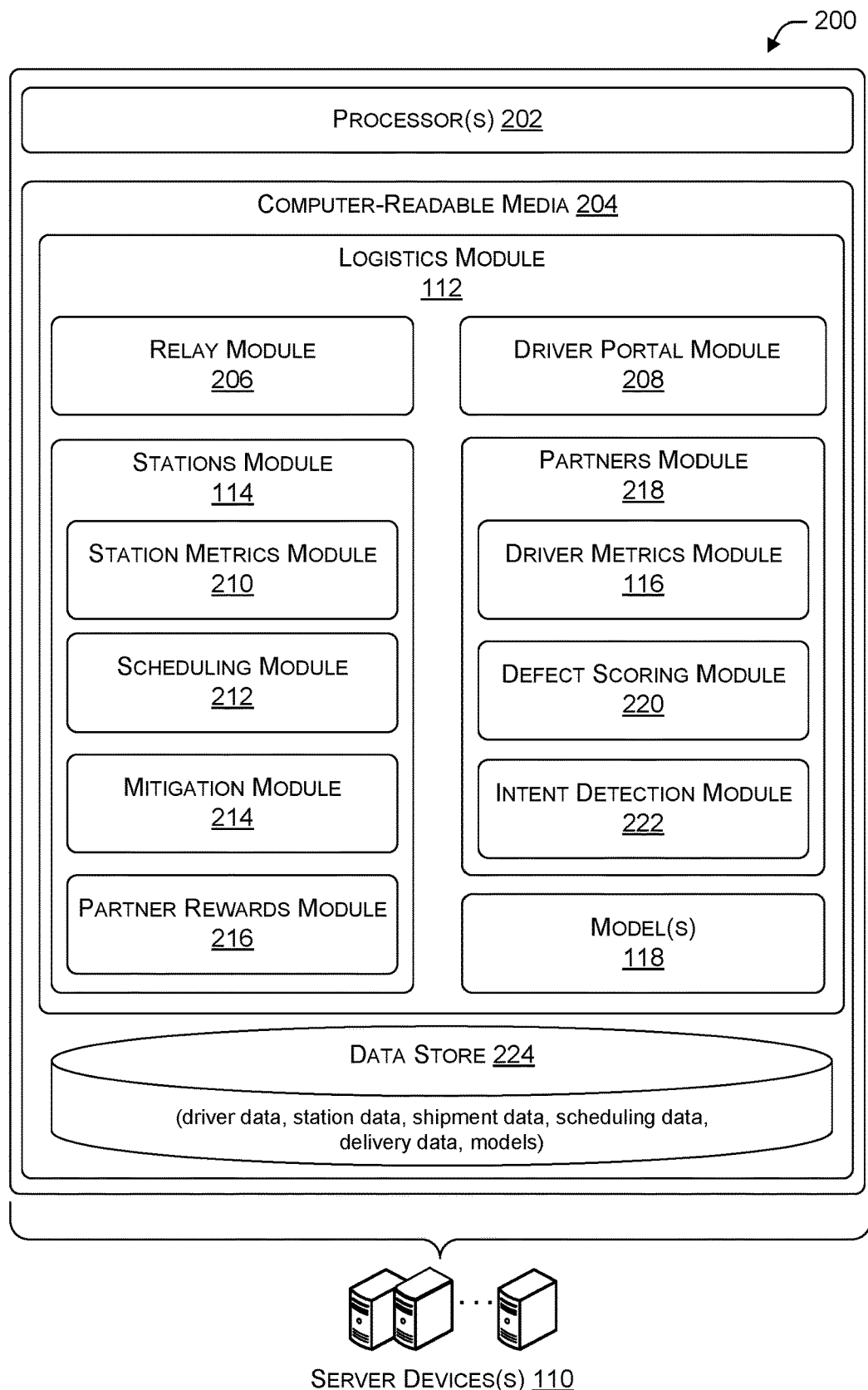
FIG. 2 is a block diagram of an illustrative computing architecture of a logistics system.

FIG. 2 is a block diagram of an illustrative computing architecture 200 of the server device(s) 110. The computing architecture 200 may be implemented in a distributed or non-distributed computing environment.

The computing architecture 200 may include one or more processor(s) 202 and one or more computer-readable media 204 that stores various modules, data structures, applications, programs, or other data. The computer-readable media 204 may include instructions that, when executed by the one or more processor(s) 202, cause the processors to perform the operations described herein for the system 100.

The computer-readable media 204 may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media appropriate for storing electronic instructions. In addition, in some embodiments, the computer-readable media 204 may include a transitory computer-readable signal (in compressed or uncompressed form). Examples of computer-readable signals, whether modulated using a carrier or not, include, but are not limited to, signals that a computer system hosting or running a computer program may be configured to access, including signals downloaded through the Internet or other networks.

The order in which the operations are described is not intended to be construed as a limitation, and any number of the described operations may be combined in any order and/or in parallel to implement the process. Furthermore, the operations described below may be implemented on a single device or multiple devices.

In some embodiments, the computer-readable media 204 may store the logistics module 112 and associated components, and the data store 224, which are described in turn. The components may be stored together or in a distributed arrangement.

The logistics module 112 may include a relay module 206, a driver portal module 208, the stations module 114 and associated components, the partners module 218 and associated components, and the model(s) 118. In some instances, the logistics module 112 can correspond to the logistics module 112 of FIG. 1. As described herein with respect to FIG. 1, the logistics module 112 may manage a network of independent delivery partners by allowing the user(s) 102 to self-onboard with user accounts and continuously monitor and update metrics for the user accounts. The logistics module 112 and associated components may generate and continuously update the model(s) 118 to increase the efficiency of the stations and drivers while performing fraud detection. In various examples, the logistics module 112 and/or one or more associated components may be part of a standalone application that may be installed and stored on the user device(s) 104.

The relay module 206 may facilitate communication and order tracking between the user(s) 102 and the service provider 108. The relay module 206 may interact with the stations module 114 and the partners module 218 to present one or more user interfaces associated with tools for the stations module 114 and the partners module 218. The relay module 206 may allow the user(s) 102 to scan orders during pick-up and delivery to inform the service provider 108 of a package location at any given time.

The driver portal module 208 may generate and present various user interfaces to communicate with the user(s) 102. In some examples, the driver portal module 208 may interact with the partners module 218 to provide an onboarding UI for the user(s) 102 to create and manage user account. The driver portal module 208 may view user account information and view stats and/or ratings, and manage financial accounts for receiving funds for delivery services. In some examples, the driver portal module 208 may present the user interfaces allowing the user(s) 102 to create different types of user accounts (e.g., individual driver, team driver, specific delivery service accounts, etc.) with the service provider 108. In at least one example, the relay module 206 may receive information associated with user(s) 102 with an entity account such as entity information (e.g., financial account(s), personnel count, business type, entity size, location, a fleet of vehicles, etc.) and actions associated with an entity account for the user(s) 102 (e.g., submissions, sales, history, business needs, etc.).

The driver portal module 208 may interact with the stations module 114 and the partners module 218 to present data and metrics from the stations module 114 and the partners module 218. As will be described herein, the data and metrics associated with the stations and drivers may include delivery data, routes/orders served, defect counts, rating, and the like. In various examples, the driver portal module 208 may receive offers from the stations module 114 and provide a driver portal UI for the user(s) 102, via the user device(s) 104, to receive delivery blocks offers and/or route assignments. The driver portal module 208 may receive user input for reservations for offers for blocks. The driver portal module 208 may receive acceptance for offers for delivery blocks and/or offers for route assignment. The driver portal module 208 may receive an onsite confirmation for the delivery block. The onsite confirmation indicates that geolocation associated with the user device 104 is within a geofence area of the station prior to the start time. The geofence area of the station may be determined by boundary coordinates of this station, a predetermined distance from a starting location coordinate, and the like. The driver portal module 208 may receive confirmation for steps that have been completed and may display instructions to receive orders.

The stations module 114 may include a station metrics module 210, a scheduling module 212, a mitigation module 214, and a partner rewards module 216. In some instances, the stations module 114 can correspond to the stations module 114 of FIG. 1. As described herein with respect to FIG. 1, the stations module 114 may receive shipment data associated with orders and process the orders for a station.

The station metrics module 210 may collect data and metrics associated with a station. The station metrics module 210 may collect data associated with the station(s) from various sources and retrieve station data as needed by the modules, including data specific to the local station and/or stations in the network, including station information and metrics (e.g., age, size, location, routes served, scores associated with routes, ratings received from customers, etc.), related user data (e.g., user accounts, user metrics from station, preferences, accounts, etc.), and station-specific training data (e.g., routes data, routes completed, etc.). The station metrics module 210 may collect shipment data for incoming shipment for orders and delivery data associated with the routes and orders.

The scheduling module 212 may determine routes and delivery blocks for orders received. The stations module 114 may receive shipment data associated with orders and the scheduling module 212 may process the orders for a station. The shipment data may include data for a shipment that arrived at the station may be processed into orders to be delivered from the station. The scheduling module 212 may create optimized routes by grouping orders based on delivery areas. The scheduling module 212 may determine the estimated delivery time and limit the optimized routes to a maximum delivery block time (e.g., 2 hours total, 3 hours total, etc.). The scheduling module 212 may determine a schedule for each delivery route, including an approximate start time and end time, and generate delivery blocks based on the delivery routes. The scheduling module 212 may generate delivery blocks to include a starting location (e.g., address for the station or the grocery store), an expected start time, an expected total delivery block time to complete the block, and payment for the block. The scheduling module 212 may determine the capacity of the station and determine to stagger the start time for the blocks to avoid too many drivers arriving at the same time.

In some examples, the scheduling module 212 may use delivery data from one or more data sources as input for predictive models (e.g., the model(s) 118). The data source may include a database for the local station, a database for all stations associated with the service provider, and/or one or more databases associated with third-party logistics application(s). The scheduling module 212 may use a predictive model to estimate the number of delivery blocks for the delivery routes. The number of delivery blocks may, at minimum, be the same as the number of delivery routes. To ensure timeliness for all delivery routes, the scheduling module 212 may intentionally "overbook" for large shipments by estimating the number of delivery blocks that is greater than the number of delivery routes to account for a percentage of delivery partners that may not show up for their blocks.

In various examples, the scheduling module 212 may determine that an Unassigned Delivery Block (UDB) defect occurred. The scheduling module 212 may send offers for the delivery blocks to the driver portal module 208. In some examples, the scheduling module 212 may receive acceptance or reservations for the offer for a delivery block and may receive a check-in notification shortly before a start time of the block. In response to the check-in notification, the scheduling module 212 may determine whether a successful check-event ("onsite confirmation") has occurred. A successful onsite confirmation indicates that a location associated with the user device 104 is within a geofence area of the station prior to the block start time. The geofence area of the station may be determined by boundary coordinates of the station, a predetermined distance from a starting location coordinate, and the like. In some examples, the scheduling module 212 may determine that the user device 104 is within the geofence area based on receiving the user device coordinates and determining if the user device coordinates are within the geofence area. In additional and/or alternative examples, the delivery stations may have on-premise sensors (e.g., cameras, BlueTooth signal, etc.), and the scheduling module 212 may receive sensor data to determine that the user device 104 and/or a vehicle associated with the user device 104 has entered the geofence area. For instance, a station may have cameras that track license plates of drivers entering and leaving the geofences area or may have BlueTooth sensors that ping the user device.

In this present example, the scheduling module 212 may determine and transmit route assignments. The scheduling module 212 may determine route assignments for the user devices that have successfully completed onsite confirmation. The scheduling module 212 may assign routes until all available routes have been assigned. If there are remaining user devices waiting for assignments, there is a UDB defect.

In some examples, the scheduling module 212 may determine that an Expired Delivery Block (EDB) defect occurred. As described herein, the scheduling module 212 may receive an onsite confirmation to commence a delivery block, wherein a user device completes a check-in event at the starting location before a start time of the block. The scheduling module 212 may determine a route assignment for the user device based on the successfully completed check-in event and transmit the route assignment with a preset offer timer. The preset offer timer may indicate a maximum amount of time (e.g., 5 minutes, 8 minutes, etc.) in which the user account is eligible to accept the route assignment. In some examples, the scheduling module 212 may determine the preset offer timer based on the expected total delivery block time. For instance, a short 2-hour delivery block has less time to wait for reassignments, and the scheduling module 212 may determine the preset offer timer is 5 minutes, but for longer 4-hour blocks, the preset offer timer may be 10 minutes. The scheduling module 212 may receive an indication that the user device failed to accept route assignment within a preset offer timer. The scheduling module 212 may determine that an EDB defect occurred and increase the EDB route count for the user account.

In various examples, the scheduling module 212 may determine that an Expired Delivery Block (EDB) defect occurred. The scheduling module 212 may determine route assignment for the user device based on the successfully completed check-in event. The scheduling module 212 may determine route assignment for the user device and transmit the route assignment with a preset offer timer indicating a maximum amount of time. The scheduling module 212 may receive an indication that the user device accepted route assignment within the maximum amount of time (e.g., within 8 minutes of assignment). The scheduling module 212 may transmit instructions to pick up the order with a preset pick-up timer indicating a maximum pick-up time. The scheduling module 212 may determine that the user account failed to complete a pick-up event for the block and elected to ignore the pick-up for the packages. The scheduling module 212 may determine that an Ignored Delivery Block (IDB) defect occurred and increase the IDB route count for the user account.

The mitigation module 214 may use the models 118 to generate models to detect and manage delivery defects. Initially, the mitigation module 214 may use historical delivery data as initial training data and apply machine learning models to generate a trained model that outputs a likelihood that a particular defect would occur. The mitigation module 214 may add new delivery data as training data to generated updated models. In some examples, the mitigation module 214 may continuously analyze delivery data to minimize and/or mitigate delivery defects caused by the scheduling module 212 intentionally overbooking. In some examples, the mitigation module 214 may process delivery data periodically (e.g., daily, every other day, weekly) to generate updated predictive models. The mitigation module 214 may detect different types of delivery defects based on a terminating step and may generate different analysis models to suggest different solutions based on the defect.

The mitigation module 214 may detect a UDB defect and determine a mitigating step. In response to detecting the UDB defect, the mitigation module 214 may increase the Unassigned Delivery Block count for the station and for the partner(s) who did not receive an assignment. The mitigation module 214 may generate an Unassigned Delivery Block (UDB) probability score model that may include the UDB count for the station when evaluating the partner(s) score.

The mitigation module 214 may analyze delivery data to identify the delivery defects and to address the cause of the defects. The mitigation module 214 may determine that a predetermined number of unintended delivery defects is acceptable based on the total delivery defect count of the delivery partner. In some examples, to improve service quality, the mitigation module 214 may identify the fraudulent users to offboard or may flag an account for analysis. The mitigation module 214 may also generate email notifications to prompt user(s) 102 to arrive at a station at an earlier time.

The mitigation module 214 may generate one or more machine learning models to determine scores for delivery partners to allow early detection of delivery defects. The models will be discussed in greater detail herein with respect to the defect scoring module 220. In some examples, the mitigation module 214 may analyze stored delivery data to determine metrics for delivery stations and delivery partners. The metrics may be used to generate models to determine probabilities for delivery defects.

In additional examples, the mitigation module 214 may determine a defect score to evaluate whether the terminating step was an intended action by the driver. The mitigation module 214 may use predictive models to score defects for a particular terminating step. The mitigation module 214 may use both historical data and periodically (e.g., daily, weekly) updated delivery data to train and use Unassigned Delivery Block (UDB) probability score models for UDB defects and Expired Delivery Block (EDB) models for EDB defects. These updated trained models may output scores that includes recently onboarded drivers to provide accurate indications of a likelihood of intentional defects or accidental events for each driver. By using these continuously updated models, the mitigation module 214 may flag delivery partners that are struggling for additional instructions and/or notifications to help improve the retention rate.

In various examples, the mitigation module 214 may include a system for a user to appeal a flagged account. The mitigation module 214 may generate notifications for the appropriate party and forward appeals for review.

The partner rewards module 216 may include functionality to generate limited offers for a preferred route or delivery block to drivers with excellent delivery history. The partner rewards module 216 may receive driver metrics and determine to provide improved offers to delivery partners with metrics correlated with high reliability. In some examples, the partner rewards module 216 may provide improved offers for orders that are more time-sensitive but has a better pay rate for the delivery. In some examples, the partner rewards module 216 may allow the high scoring delivery partners to select preferred stations and may present offers for the preferred stations to the high scoring delivery partners before releasing remaining offers to the general partners pool.

The partners module 218 may include the driver metrics module 116, a defect scoring module 220, and an intent detection module 222. The partners module 218 may maintain a database of driver data. The partners module 218 may collect data associated with user(s) 102 from various sources and retrieve user data as needed by the modules, including data specific to the user account, including driver information and metrics (e.g., vehicle, insurance, routes served, scores associated with routes, ratings received from customers, etc.), personal user data (e.g., age, gender, preferences, accounts, etc.), and user-specific training data (e.g., routes data, blocks completed, etc.).

The driver metrics module 116 may receive and analyze delivery data to update metrics for driver accounts included in the delivery data. In some instances, the driver metrics module 116 can correspond to the driver metrics module 116 of FIG. 1. As described herein with respect to FIG. 1, the driver metrics module 116 may maintain driver account data, including driver information, driver metrics, delivery records, and delivery metrics (e.g., late delivery, delivered and received (DAR), delivered not received (DNR), delivery completion rate (DCR)). The driver metrics module 116 may occasionally purge inactive accounts if the account was never activated. If an account becomes inactive due to enforcement actions against intentional fraudulent behavior, the driver metrics module 116 may store the account data for at least a predetermined length of time.

In some examples, the driver metrics module 116 may receive and parse delivery data from a database or additional data source (e.g., data from a third-party delivery application) for additional data, including metrics and/or features that may influence a delivery service level of a driver. These additional sources may include data specific to a route/block (e.g., block time information and a number of orders in the block); data specific to the warehouse (e.g., warehouse business type and station age); data specific to the driver static information (e.g., driving age and onboard location); and data specific to the driver performance history (e.g., lifetime block count and Expired Delivery Block (EDB) count in the last 14 days).

The driver metrics module 116 may determine the delivery data includes one or more delivery defects, and the defect scoring module 220 may analyze the defects.

The defect scoring module 220 may analyze delivery data to identify and score delivery defects associated with a driver account. A delivery defect may be an event that includes a driver account accepting a delivery block and completing a check-in for the delivery block, but the driver failed to complete delivery of one or more items due to any number of reasons. The reasons may include, but are not limited to, the station overbooking drivers, the driver lacking experience or familiarity with a station, the driver intentionally defrauding the system, the driver experiencing phone and/or vehicle issues, and the like.

In various examples, if a user account indicates several recent consecutive delivery defects on record, the defect scoring module 220 may use historical delivery data associated with the driver and/or the delivery station to determine whether the driver is attempting to defraud the system or is in need of some additional instructions. To evaluate the defects on record, the defect scoring module 220 may determine a defect score for each defect and an aggregation scheme to aggregate the defect scores. The defect scoring module 220 may evaluate aggregate scores relative to predetermined thresholds and/or relative the scores of other onboarded drivers to determine whether to apply a remedial step. Example remedial steps may include automatically offboarding intentional fraudulent behavior (e.g., 100% delivery defects 10 or more consecutive delivery blocks), putting an account on temporary hold while flagging the account for further review, flagging an account to require additional instructions for the driver, sending additional notifications and/or reminders to help the driver improve, and the like.

In some examples, the defect scoring module 220 may apply one or more model(s) 118 based on a terminating step of the delivery defect and determine a defect score to evaluate whether the terminating step was an intended action by the driver. The defect scoring module 220 may consider the terminating step with respect to the steps for completing a route. For instance, the steps may include: (1) accepting the offer for a delivery block and completing a check-in event at the starting location before a start time of the block; (2) receiving an offer for a route assignment and accepting the offer before the offer timer expires, (3) completing a pick-up event receive the packages for the route, and (4) completing delivery for all orders on the route and/or block. As described herein, terminating after the first step is a Unassigned Delivery Block (UDB) defect; terminating after the second step is an Expired Delivery Block (EDB) defect, and terminating after the third step is an Ignored Delivery Block (IDB) defect.

In various examples, the defect scoring module 220 may apply a particular model(s) 118 to score defects for a particular terminating step. For instance, the defect scoring module 220 may use an Unassigned Delivery Block (UDB) model for UDB defects, an Expired Delivery Block (EDB) model for EDB defects, and an Ignored Delivery Block (IDB) model for IDB defects. Although examples of UDB model and EDB model are described herein, the defect scoring module 220 may train and use any machine learning model(s) 118 to score the defects.

In a non-limiting example, the defect scoring module 220 may use a distribution-based model for an Unassigned Delivery Block (UDB) probability score model. In the UDB probability score model, the UDB defect follows binomial distribution while the probability of a UDB defect is equal to the UDB rate of the station. The UDB probability score model—scores are calculated as the probability of accumulating x UDBs over n blocks with the following equation:

$$P(x) = \frac{n!}{(n-x)! \, x!} p^x q^{n-x},$$

wherein P(x) is the output of the UDB probability score model, p is the probability of getting a UDB defect at the station, and q=1−p.

The UDB probability score model may consider driver historical UDB count. The UDB probability score model includes the station UDB defect rate in the equation to account for station differences.

The output (P(x)) is a driver probability score instead of a UDB defect count. Accordingly, the two drivers with the same UDB defect count may be treated differently based on their assigned station(s). The UDB probability score model includes a parameter for lookback blocks n. In an example, the defect scoring module 220 may use n=5 based on determining this is a minimum block threshold that the model can detect fraudulent users. By using the minimum block threshold, the defect scoring module 220 may account for a newly onboarded partner with this UDB model.

In another non-limiting example, for the Expired Delivery Block (EDB) model, the defect scoring module 220 may use one or more ML model(s) 118 to generate EDB scores for each delivery partner and rank the EDB scores to determine fraudulent level. In some examples, the defect scoring module 220 may determine that a higher EDB score corresponds to a greater indication of intentional activities. The defect scoring module 220 may generate new EDB scores and update ranking on a predetermined periodic basis (e.g., daily, weekly, etc.). Initially, the defect scoring module 220 may process delivery data for the EDB model by mapping orders by routes and/or delivery blocks. The defect scoring module 220 may determine an ML model(s) 118 (e.g., k-neighbors regressor) for estimating an intent index to differentiate between accidental EDB routes versus. intentional EDB routes. The intent index is a probability value and may be expressed as any value type including fractions, percent, and the like. In this present example, the intent index is expressed as any value from 0 to 1, wherein 0 indicates an accidental defect and 1 indicates an intentional defect. The defect scoring module 220 may use a k-neighbor regressor model to classify route data as a negative class or a positive class, the positive class indicating a positive association with the likelihood of intentional defect, the negative class indicating a negative association with the likelihood of intentional defect (or a positive association with a likelihood of accidental defect).

In the present example, the defect scoring module 220 may aggregate EDB data. The defect scoring module 220 may preprocess delivery data by grouping orders by routes. The defect scoring module 220 may train an ML model 118 (e.g., k-neighbors regressor) to estimate the intent index between accidental EDB routes versus intentional EDB routes. In some examples, the defect scoring module 220 may aggregate data, based on incorporating the intent index and time decay in calculating the weighted EDB route count and weighted EDB rate for each driver and calculate the EDB score for each driver. The defect scoring module 220 may apply a filter and output score. The filter may determine whether the drivers have more than 3 days of EDB occurrences before they can be offboarded.

The Expired Delivery Block (EDB) model may aggregate individual EDB routes to individual delivery partners and determine individual delivery partner scores. The defect scoring module 220 may aggregate a total route count for the user account. The defect scoring module 220 may determine an aggregated EDB rate for the user accounts based on the aggregated EDB route count and the aggregated total route count.

The defect scoring module 220 may use the intent index and a time decay to determine a weighted Expired Delivery Block (EDB) route count and weighted EDB rate for each delivery partner.

$$\text{weighted EDB route count} = \sum_{EDB\ routes} A_i \exp(-\lambda dt_i)$$

$$\text{weighted all route count} = \sum_{all\ routes} \exp(-\lambda dt_i)$$

$$\text{weighted EDB rate} = \frac{\text{weighted EDB route count}}{\text{weighted all route count}}$$

wherein $A_i$ is the intent index, $\lambda$ is the decay coefficient, and $dt_i$ is the time difference between the route time and evaluation scoring day. The decay halftime is 14 days (i.e. a route will weigh half as much after 14 days). When determining the Expired Delivery Block (EDB) score, a lookback of a 14-day window is used.

In some examples, the defect scoring module 220 may use the EDB model to output a delivery partners list with individual partner EDB scores, periodically (e.g., daily, every other day, weekly). The delivery partners list may include the individual partner EDB scores ranked from lowest to highest. The defect scoring module 220 may determine that the higher ranking scores correspond to higher indications of intentional defects. In some examples, the defect scoring module 220 may apply a post-model filter to avoid punishing newly onboarded delivery partners by applying an exemption rule to the EDB model to require driver metrics to indicate EDB occurrence on more than a predetermined threshold number of days (e.g., greater than 3 days) before a driver can be offboarded.

The intent detection module 222 may apply the models to determine the defect scores for the individual partner and determine a likelihood for intentional defects. The intent detection module 222 may use the defect scoring module 220 to generate models and scores and determine whether the scores correspond to indications of fraudulent activities. In some examples, the intent detection module 222 and/or the defect scoring module 220 may apply a post-model filter to avoid punishing newly onboarded delivery partners by applying an exemption rule to the models to require driver metrics to indicate defect occurrence on more than a predetermined threshold number of days (e.g., greater than 3 days) before a partner can be offboarded.

In some examples, the intent detection module 222 may determine different levels of the threshold for the scores to flag the account or offboard the account. For instance, the intent detection module 222 may determine a first "flagged" threshold based on some likelihood for a defect to occur and may determine to offboard an account-based a high likelihood for a defect to occur. For instance, the intent detection module 222 may flag an account for a 30% Unassigned Delivery Block (UDB) rate and may offboard an account based on a 100% UDB rate.

Accordingly, the logistics module 112 may use any portion of the driver data, station data, shipment data, scheduling data, and/or delivery data stored in the data store 224 as input to train one or more of machine learning model(s) 118. Machine learning generally involves processing a set of examples (called "training data") in order to train a machine learning model(s). A machine learning model(s) 118, once trained, is a learned mechanism that can receive new data as input and estimate or predict a result as output. For example, a trained machine learning model can include a classifier that is tasked with classifying unknown input (e.g., an unknown image) as one of the multiple class labels (e.g., labeling the image as a cat or a dog).

The machine learning model(s) 118 may represent a single model or an ensemble of base-level machine learning model(s) 118 and may be implemented as any type of machine learning model. For example, suitable machine learning model(s) 118 for use with the techniques and systems described herein include, without limitation, tree-based models, support vector machines (SVMs), kernel methods, neural networks, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of model(s) 118, as stored in the data store 224, whose outputs (classifications) are combined, such as by using weighted averaging or voting. The individual machine learning model(s) 118 of an ensemble can differ in their expertise, and the ensemble can operate as a committee of individual machine learning model(s) 118 that is collectively "smarter" than any individual machine learning model of the ensemble.

The data store 224 may store at least some data including, but not limited to, data collected from the relay module 206, the driver portal module 208, the stations module 114 and associated components, the partners module 218 and associated components, and the model(s) 118 including data associated with user account including driver data, station data, shipment data, scheduling data, delivery data, and the like. In an example, the data may be automatically added via a computing device (e.g., the server device(s) 110). Driver data may correspond to one or more user accounts associated with the user(s) 102. Station data may correspond to one or more delivery stations associated with the service provider 108. Shipment data may correspond to one or more orders to be processed by the delivery stations associated with the service provider 108. Scheduling data may correspond to one or more routes and blocks generated for the delivery stations. Delivery data may correspond to data collected after delivery of the shipment, including orders and routes and delivery metrics received associated with the delivery stations and/or the user(s) 102.

Figure 3:
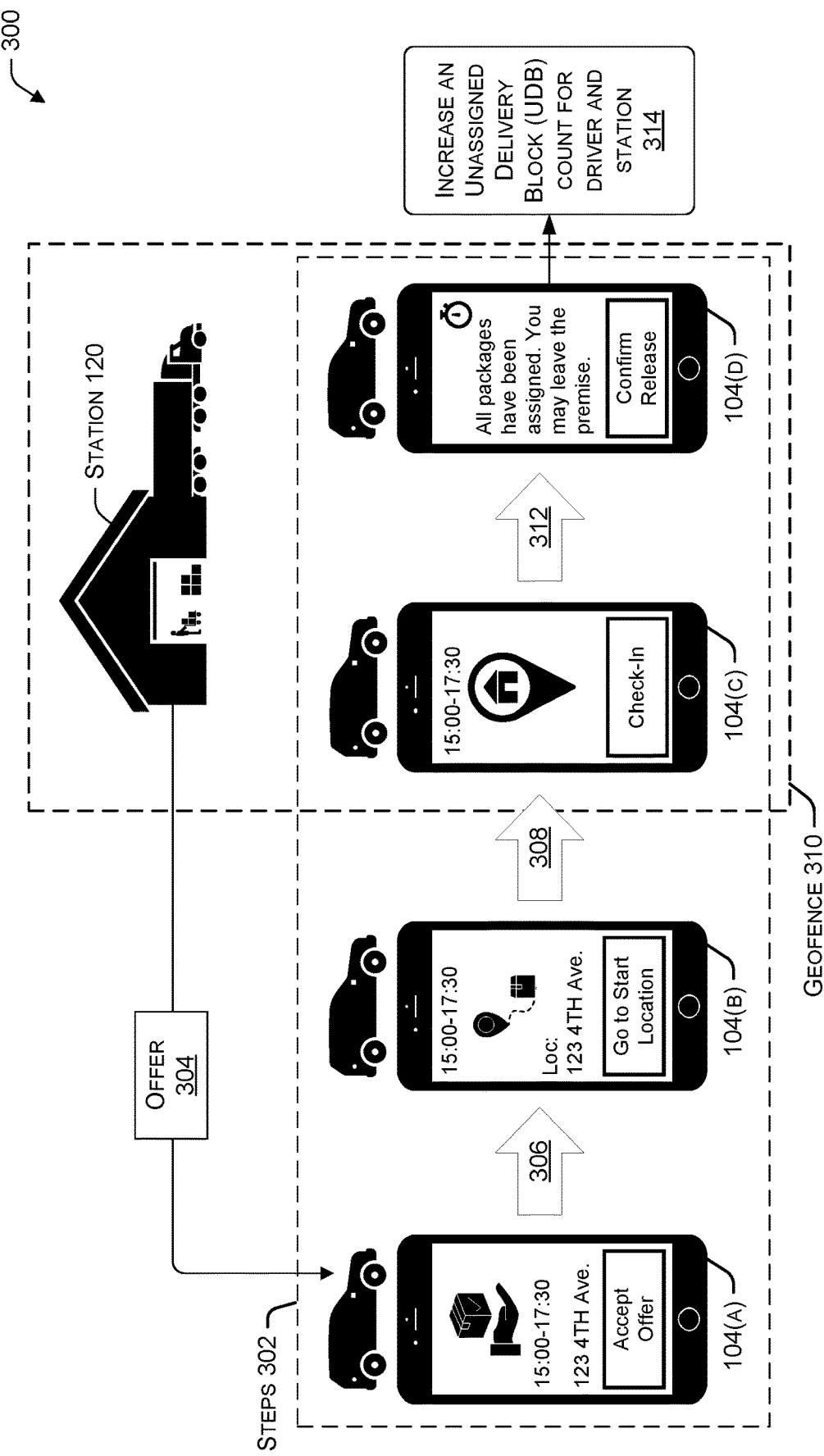
FIG. 3 is a schematic diagram showing an example delivery system including steps leading to an Unassigned Delivery Block (UDB) defect.

FIG. 3 is a schematic diagram showing an example delivery system 300 including steps leading to an Unassigned Delivery Block (UDB) defect. The example delivery system 300 illustrates an exemplary scenario in how a station and driver may acquire a UDB count.

As a non-limiting example, a driver portal user interface (UI) may be presented to a user account associated with a device 104 for example steps 302. The example steps 302 may include exemplary driver portal UI as presented on the same device 104, as an example UI 104(a), example UI 104(b), example UI 104(c), and example UI 104(d).

The driver portal UI, as presented in the example UI 104(a) presents a selected offer for a delivery block. For instance, the user 102 may accept a short 2.5-hour delivery block work at station 120. The user 102 may accept the offer via the example UI 104(a). After accepting the offer, the driver portal UI may prompt the user 102 to the station 120.

In response to user 102 accepting the offer for step 306, the driver portal UI transitions to the example UI 104(b). After accepting "Go to Start Location," the driver portal UI may trigger a maps application and guide user 102 to the station.

In response to user 102 driving to a starting location for step 308, the driver portal UI transitions to the example UI 104(c) based on the user device 104 is within the geofence area 310 of station 120. After the user arrives at the station, the driver portal UI may prompt the user 102 to click "Check-In."

In response to user 102 successfully completing check-in at a starting location for step 312, the driver portal UI may transitions a user interface to wait for a route assignment. In the example UI 104(d), the user device 104 has waited within the geofence of the station for a predetermined time period (e.g., 30 minutes), and the UI is notifying the user 102 they can learn because there are no more packages to be pick-up. The process 314 may determine that both the station and user 102 have acquired n UDB count.

Figure 4:
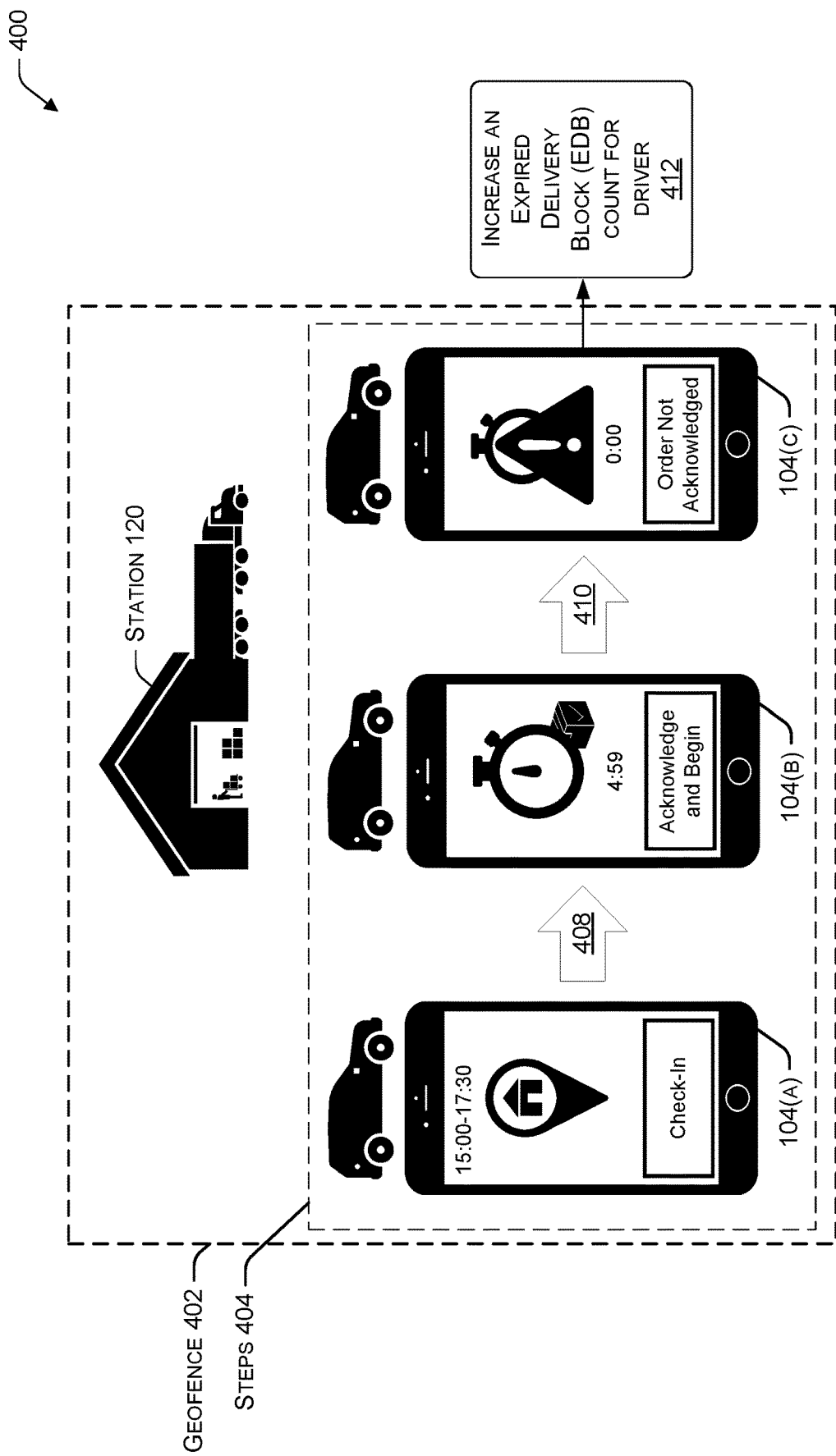
FIG. 4 is a schematic diagram showing an example delivery system including steps leading to an Expired Delivery Block (EDB) defect.

FIG. 4 is a schematic diagram showing an example delivery system 400, including steps leading to an Expired Delivery Block (EDB) defect. The example delivery system 400 illustrates an exemplary scenario in how a driver may acquire an EDB defect count.

As a non-limiting example, a driver portal user interface (UI) may be presented to a user account associated with a device 104 for example steps 404. The example steps 404 may include exemplary driver portal UI as presented on the same device 104, as an example UI 104(a), example UI 104(b), and example UI 104(c).

The driver portal UI, as presented in the example UI 104(a) presents a UI for device 104 that has entered a starting area for a delivery block. After the user 102 arrives at the station 120, the driver portal UI may prompt the user 102 to click "Check-In."

In response to user 102 successfully checking in for step 408, the driver portal UI transitions to the example UI 104(b). The example UI 104(b) indicates a route has been assigned to user 102 and waits for input from the device to acknowledge the assignment and to receive further instructions for order item pick-up. In this non-limiting example, the system transmits the route assignment with a preset offer timer by putting 5 minutes on the countdown timer to prompt the user to pick up the packages for the order. The total time for this work block is 2.5 hours; thus, the system uses the countdown timer to move the delivery partners along. It is understood in the context of this document that the 5 minutes for the preset offer timer and 2.5 hours for the total delivery block time are non-limiting examples. Additionally, if, for some reason, the user device or vehicle fails, the system can reassign the route. In the present example, the user 102 may be experiencing signal loss and did not respond within the 5 minutes offer window.

In response to user 102 failing to acknowledge the assignment and letting the offer timer expire for step 410, the driver portal UI transitions to the example UI 104(c) based on the offer timer expiring. The driver portal UI is notifying user 102 they failed to acknowledge an order assignment.

The process 412 may determine that user 102 has acquired an Expired Delivery Block (EDB) defect count. As described herein, an EDB defect count may be caused by the device 104 losing signal or, in some cases, by the user intentionally ignore the assignment. If the system determines the user accidentally caused the EDB defect, the system may flag the account to notify the system to generate additional notification next time. In some examples, if the user has secondary contact information, the system may send information to the secondary contact.

Figure 5:
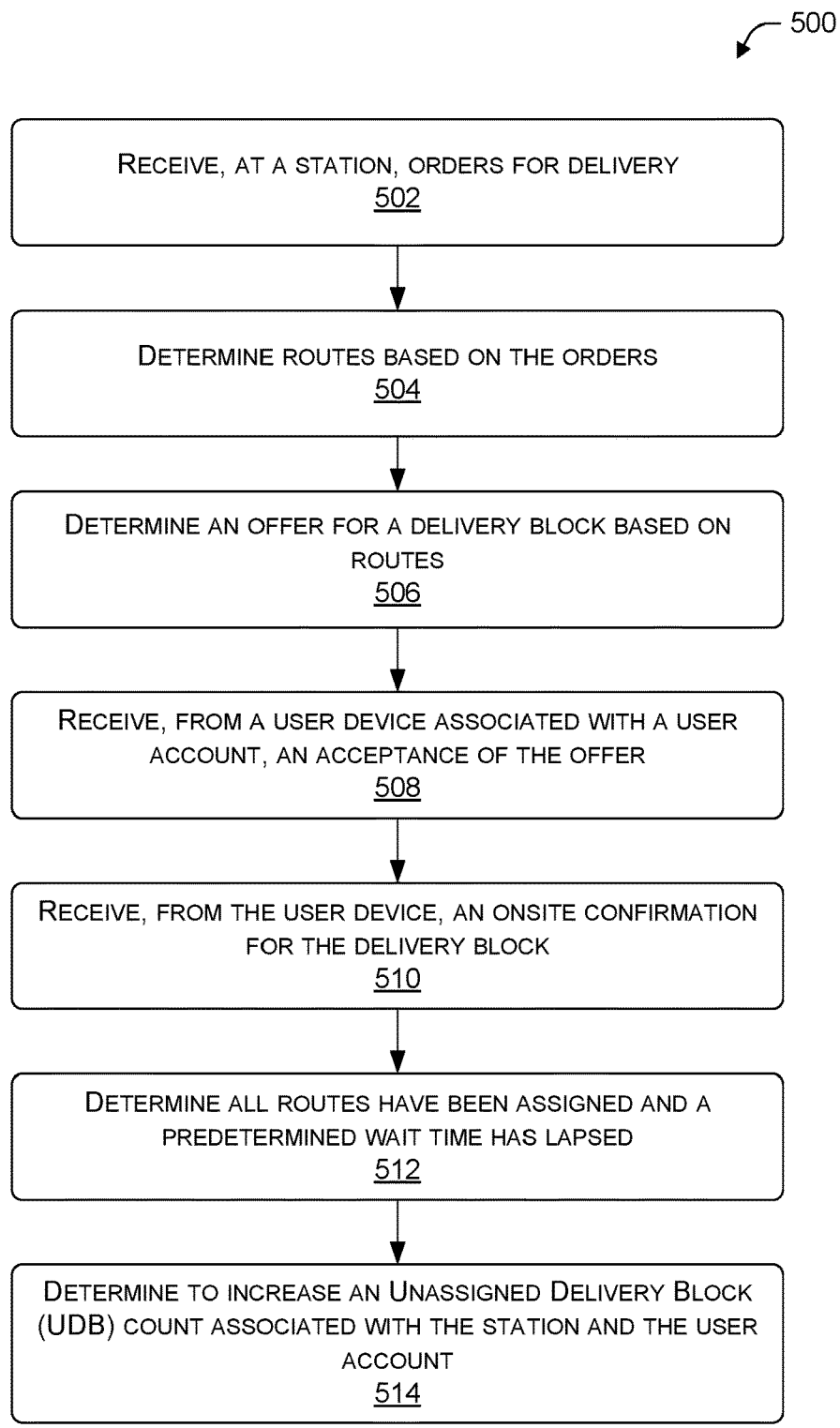
FIG. 5 is a flow diagram of an illustrative process for determining Unassigned Delivery Block (UDB) defect.
Figure 6:
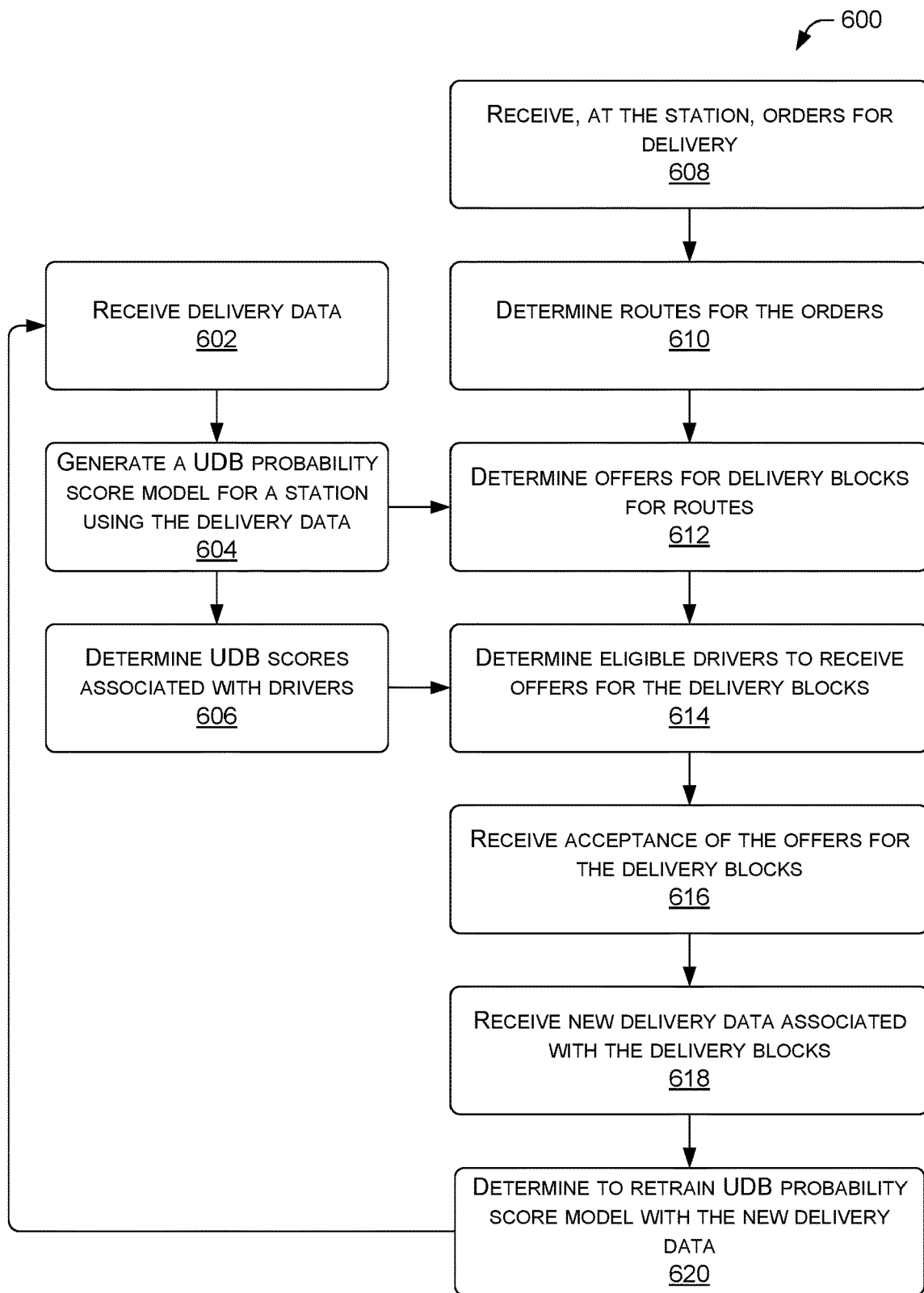
FIG. 6 is a flow diagram of an illustrative process for a continuous feedback loop of receiving data associated with delivery blocks and generating an Unassigned Delivery Block (UDB) probability score model.
Figure 7:
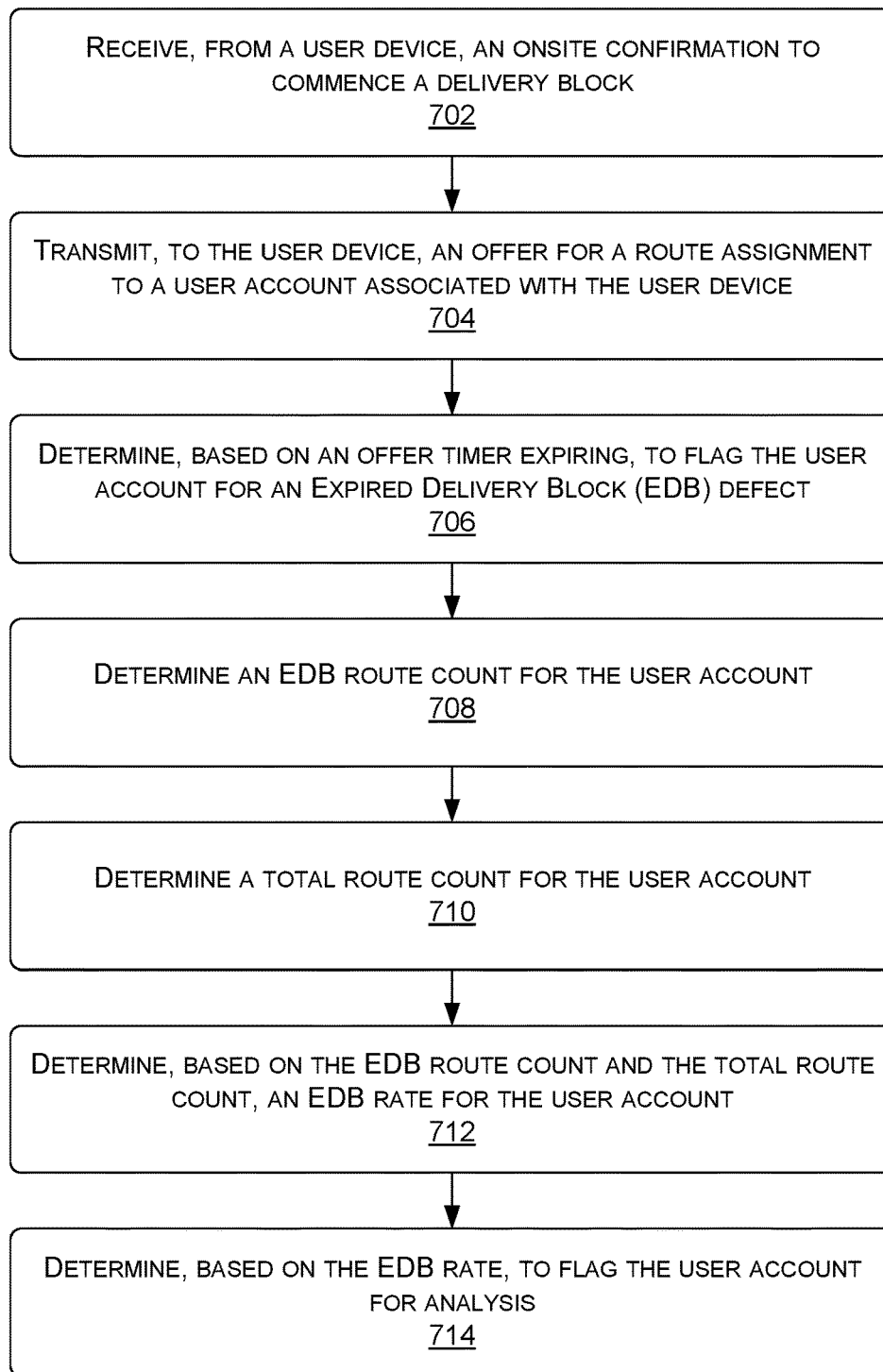
FIG. 7 is a flow diagram of an illustrative process for generating an Expired Delivery Block (EDB) scoring model.

FIGS. 5-7 are flow diagrams of illustrative processes. The example processes are described in the context of the environment of FIG. 2 but are not limited to that environment. The processes are illustrated as a collection of blocks in a logical flow graph, which represents a sequence of operations that can be implemented in hardware, software, or a combination thereof. In the context of software, the blocks represent computer-executable instructions stored on one or more computer-readable media 204 that, when executed by one or more processor(s) 202, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes discussed below may be combined in any way to create derivative processes that are still within the scope of this disclosure.

FIG. 5 is a flow diagram of illustrative process 500 for determining UDB defects. The process 500 is described with reference to the system 100 and may be performed by the user device(s) 104 and/or in cooperation with any one or more of the server device(s) 110. Of course, the process 500 (and other processes described herein) may be performed in other similar and/or different environments.

At operation 502, the process can include receiving, at a station, orders for delivery. In some examples, the system may receive shipment data associated with orders and process the orders for a station, as described herein. The shipment data may include data for a shipment that arrived at the station may be processed into orders to be delivered from the station. The system may create optimized routes by grouping orders based on delivery areas.

At operation 504, the process can include determining routes based on the orders. In some examples, the system may receive shipment data associated with orders and create optimized routes by grouping orders based on delivery areas, as described herein. The system may determine an estimated delivery time and limit the optimized routes to a maximum delivery block time (e.g., 2 hours total, 3 hours total, etc.). The system may determine a schedule for each delivery route, including an approximate start time and end time, and generate delivery blocks based on the delivery routes.

At operation 506, the process can include determining an offer for a delivery block based on routes. In some examples, the system may determine a schedule for each delivery route, including an approximate start time and end time, as described herein. The system may generate offers for delivery blocks based on the delivery routes. The delivery partners may view and reserve offers for one or more delivery blocks as long as the start time and end time of the blocks do not overlap.

At operation 508, the process can include receiving, from a user device associated with a user account, an acceptance of the offer. In some examples, the system may post offers for the delivery blocks, as described herein. An onboarded delivery partner may accept an offer and reserve an offer for a delivery block and may release the reservation before the system acknowledges the reservation.

At operation 510, the process can include receiving, from the user device, an onsite confirmation for the delivery block. In some examples, the system may receive acceptance for offers for delivery blocks and/or offers for route assignment, as described herein. The system may receive an onsite confirmation for the delivery block. The onsite confirmation indicates that geolocation associated with the user device is within a geofence area of the station prior to the start time and the geofence area of the station includes a predetermined distance from the starting location.

At operation 512, the process can include determining all routes have been assigned and a predetermined wait time has lapsed. In some examples, the system may assign the routes based on the order of arrival, as described herein. After the system assigns all available delivery routes, the number of overbooked users remains. The system may determine an Unassigned Delivery Block (UDB) event occurred. After a predetermined wait time has lapsed, if there are no expired blocks or ignored blocks, the system may transmit messages for the remaining users with UDB that they are free to leave and credit each user account the block payment. For each of the remaining unassigned users, the system increases the UDB count for the account by one. Additionally, the system may increase the UDB count for the station. The station may include a UDB event count, and wherein all the users equal one increase, and a UDB total count, wherein the UDB total count increases by the number of unassigned users.

At operation 514, the process can include determining to increase an Unassigned Delivery Block (UDB) count associated with the station and the user account. In some examples, if there are no expired blocks or ignored blocks after a predetermined wait time has elapsed, the system may transmit messages for the remaining users with unassigned blocks that they are free to leave and credit each user account the block payment, as described herein. For each of the remaining unassigned users, the system increases the UDB count for the user account by one. Additionally, the system may increase the UDB count for the station. The station may include a UDB event count, and wherein all the users equal one increase, and a UDB total count, wherein the UDB total count increases by the number of unassigned users.

FIG. 6 is a flow diagram of illustrative process 600 for a continuous feedback loop of receiving data associated with delivery blocks and generating a UDB probability score model. The process 600 is described with reference to the system 100 and may be performed by the user device(s) 104 and/or in cooperation with any one or more of the server device(s) 110. Of course, the process 600 (and other processes described herein) may be performed in other similar and/or different environments.

At operation 602, the process can include receiving delivery data. In some examples, the system may receive shipment data associated with orders and process the orders for a station, as described herein. The shipment data may include data for a shipment that arrived at the station may be processed into orders to be delivered from the station. The system may create optimized routes by grouping orders based on delivery areas.

At operation 604, the process can include generating an Unassigned Delivery Block (UDB) probability score model for a station using the delivery data. In some examples, the system may receive shipment data associated with orders and process the orders for a station, as described herein. The system may use a distribution-based model for a UDB probability score model. In the UDB probability score model, the UDB defect follows binomial distribution while the probability of a UDB defect is equal to the UDB rate of the station. The UDB probability score model—scores are calculated as the probability of accumulating x UDBs over n blocks with the following equation: $P(x)=[n!/((n-x)!x!)] *p^x q^{(n-x)}$, wherein $P(x)$ is the output of the UDB probability score model, p is the probability of getting a UDB defect at the station, and $q=1-p$. The UDB probability score model may consider driver historical UDB count. The UDB probability score model includes the station UDB defect rate in the equation to account for station differences. The output ($P(x)$) is a driver probability score instead of a UDB defect count.

At operation 606, the process can include determining UDB scores associated with drivers. In some examples, the system may determine UDB scores associated with drivers, as described herein.

At operation 608, the process can include receiving, at the station, orders for delivery. In some examples, the system may receive shipment data associated with orders and process the orders for a station, as described herein. The shipment data may include data for a shipment that arrived at the station may be processed into orders to be delivered from the station. The system may create optimized routes by grouping orders based on delivery areas.

At operation 610, the process can include determining routes for the packages. In some examples, the system may create optimized routes by grouping orders based on delivery areas, as described herein.

At operation 612, the process can include determining offers for delivery blocks for routes. In some examples, the system may determine, using the UDB probability score model, offers for delivery blocks for routes, as described herein with respect to operations 604.

At operation 614, the process can include determining eligible drivers to receive offers for the delivery blocks. In some examples, the system may determine, using the UDB probability score model, offers for delivery blocks for routes, as described herein with respect to operations 604.

At operation 616, the process can include receiving acceptance of the offers for the delivery blocks. In some examples, the system may post offers for the delivery blocks, as described herein. An onboarded delivery partner may accept an offer and reserve an offer for a delivery block and may release the reservation before the system acknowledges the reservation.

At operation 618, the process can include receiving new delivery data associated with the delivery blocks. In some examples, the system may post offers for the delivery blocks, as described herein. The system may determine a defect score to evaluate whether the terminating step was a fraudulent act by the driver. The system may use predictive models to score defects for a particular terminating step. The system may use both historical data and periodically (e.g., daily, weekly) updated delivery data to train and use UDB probability score models for UDB defects. These updated trained models may output scores that includes recently onboarded drivers to provide accurate indications of a likelihood of intentional defects or accidental events for each driver. By using these continuously updated models, the system may flag delivery partners that are struggling and could use additional instructions to help improve the retention rate.

At operation 620, the process can include determining to retrain the UDB probability score model with the new data. In some examples, the system may use both historical data and periodically (e.g., daily, weekly) updated delivery data to train and use UDB probability score models for UDB defects, as described herein. The process may return to operation 602.

FIG. 7 is a flow diagram of illustrative process 700 for a continuous feedback loop of receiving data associated with delivery blocks and generating a UDB probability score model. The process 700 is described with reference to the system 100 and may be performed by the user device(s) 104 and/or in cooperation with any one or more of the server device(s) 110. Of course, the process 700 (and other processes described herein) may be performed in other similar and/or different environments.

At operation 702, the process can include receiving, from a user device, an onsite confirmation to commence a delivery block. In some examples, the system may receive acceptance for offers for delivery blocks and/or offers for route assignment, as described herein. The system may receive an onsite confirmation for the delivery block. The onsite confirmation indicates that geolocation associated with the user device is within a geofence area of the station prior to the start time and the geofence area of the station includes a predetermined distance from the starting location.

At operation 704, the process can include transmitting, to the user device, an offer for a route assignment to a user account associated with the user device. In some examples, the system may receive acceptance for offers for delivery blocks and/or offers for route assignment, as described herein. The system may receive an onsite confirmation for the delivery block.

At operation 706, the process can include determining, based on a preset offer timer expiring, to flag the user account for an Expired Delivery Block (EDB) defect. In some examples, the system may receive an onsite confirmation to commence a delivery block, as described herein. The system may determine route assignment for the user device based on the successful completed check-in event. The system may receive an indication that the user device failed to accept route assignment within a preset offer timer (e.g., within 8 minutes of assignment). The system may determine that an EDB defect occurred and increase the EDB route count for the user account.

At operation 708, the process can include determining an EDB route count for the user account. In some examples, the system may determine that EDB defect occurred and increase the EDB route count for the user account, as described herein.

At operation 710, the process can include determining a total route count for the user account. In some examples, the system may have a total route count for the user account, as described herein. The system may aggregate Expired Delivery Block (EDB) data. The EDB model may aggregate individual EDB routes to individual delivery partners and determine individual delivery partner scores.

At operation 712, the process can include determining, based on the EDB route count and the total route count, an EDB rate for the user account. In some examples, the system may determine, based on the EDB route count and the total route count, an EDB rate for the user account, as described herein. In various examples, the system may aggregate data based on incorporating an intent index and a time decay in calculating the weighted EDB route count and weighted EDB rate for each driver and calculate the EDB score for each driver. The system may aggregate a total route count for the user account. The system may determine an aggregated EDB rate for the user accounts based on the aggregated EDB route count and the aggregated total route count At operation 714, the process can include determining, based on the EDB rate, to flag the user account for analysis. In some examples, the system may determine, based on the EDB route count and the total route count, an EDB rate for the user account, as described herein. The system may use the EDB model to output a delivery partners list with individual partner EDB scores periodically (e.g., daily, weekly). As discussed herein, the higher score corresponds to greater indications of intentional defects.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   one or more processors; and
   memory storing computer-executable instructions that, when executed, cause the one or more processors to perform operations comprising:
   determining a first number of routes for delivery orders associated with a station, individual routes of the routes including one or more of the delivery orders;
   generating, using first training data, one or more machine learning (ML) models, the first training data including a first portion of historical delivery data associated with the station, wherein generating the one or more ML models includes:
      determining, based on the first training data, an aggregated route count for user accounts indicating Unassigned Delivery Block (UDB) counts associated with individual accounts of the user accounts;
      determining, based on the first training data, a UDB defect rate associated with the station; and
      determining, based on the aggregated route count and the UDB defect rate, probabilities of accumulating UDB defects at the station;
   determining, using the one or more ML models, individual UDB scores associated with the individual accounts indicating likelihood of intentional UDB defects, wherein the individual UDB scores are adjusted based on a weight associated with meeting a minimum block threshold;
   determining, using the one or more ML models, a second number of offers for delivery blocks associated with the station, the second number of offers being greater than or equal to the first number of the routes, individual delivery blocks of the delivery blocks including a starting location, a starting time, and a payment associated with the individual delivery blocks;
   receiving, from a first user device associated with a first user account, first acceptance for a first block of the delivery blocks;
   receiving, from a second user device associated with a second user account, second acceptance for a second block of the delivery blocks;
   receiving a first onsite confirmation from the first user device, wherein the first onsite confirmation indicates that a first geolocation associated with the first user device is within a geofence area of the station prior to the start time, wherein the geofence area of the station includes a predetermined distance from the starting location;
   receiving a second onsite confirmation from the second user device;
   determining to assign a first route of the routes to the first user account;
   determine that an entirety of the routes have been assigned to user accounts;
   transmitting, to the second user device, a message to release the second user device from the geofence area;
   determining, based on the first onsite confirmation and the second onsite confirmation, to transmit a first payment to the first user account and a second payment the second user account;
   determining that a UDB defect occurred with respect to at least one of the delivery blocks associated with the station;
   determining, based on the UDB defect, to increase a first UDB count associated with the second user account and a second UDB count associated the station;
   determining, using second training data, to retrain the one or more ML models, the second training data including at least a second portion of the first training data and delivery data for the delivery orders; and
   determining, using the one or more ML models after being retrained, a UDB score associated with the second user account, the UDB score indicating a probability that the second user account will accumulate an additional UDB defect.

2. The system as recited in claim 1, wherein the delivery data includes the second UDB count, and the one or more ML models are configured to output a predicted UDB score for users associated with the station.

3. The system as recited in claim 1, the operations further comprising:
   determining that the UDB score is equal to or greater than a threshold; and
   determining, based on the UDB score being equal to or greater than the threshold, to flag the second user account, wherein the flag prevents the second user account from receiving additional offers for additional blocks until the flag is cleared.

4. The system as recited in claim 3, the operations further comprising:
   determining that the first UDB count is less than a minimum UDB count threshold; and
   determining, based on the first UDB count being less than the minimum UDB count threshold, to clear the flag for the second user account.

5. A computer-implemented method comprising:
   determining a first number of routes for delivery orders associated with a station;
   generating, using first training data, one or more machine learning (ML) models, the first training data including a first portion of historical delivery data associated with the station, wherein generating the one or more ML models includes:
      determining, based on the first training data, an aggregated route count for user accounts indicating Unassigned Delivery Block (UDB) counts associated with individual accounts of the user accounts;
      determining, based on the training data, a UDB defect rate associated with the station; and
      determining, based on the aggregated route count and the UDB defect rate, a probability of accumulating UDB defects at the station;

determining, using the one or more ML models, individual UDB scores associated with the individual accounts of the user accounts indicating likelihood of intentional UDB defects, wherein the individual UDB scores are adjusted based on a weight associated with meeting a minimum block threshold;

determining, by applying the one or more ML models to the first number of routes, a second number of offers for delivery blocks, the second number of offers being greater than or equal to the first number of routes;

receiving, from a user device associated with a user account, an onsite confirmation for a delivery block of the delivery blocks, wherein the onsite confirmation indicates that the user device is within a predetermined distance from a starting location;

determining that the first number of routes has been assigned;

determining, based at least in part on a predetermined time period having lapsed, to apply a credit or a payment to the user account;

transmitting, to the user device, a message to release the user device from the station;

determining, based at least in part on the user device not receiving a route assignment, that a defect has occurred;

determining to increase a first defect count associated with the user account and a second defect count associated the station;

determining, using second training data, to retrain the one or more ML models, the second training data including at least a second portion of the first training data and delivery data for the delivery orders; and determining, using the one or more ML models after being retrained, a UDB score associated with the user account, the UDB score indicating a probability that the user account to will accumulate one or more additional defects at the station.

6. The computer-implemented method as recited in claim 5, further comprising:

generating a user interface to present a user portal, the user portal including an interface to receive user information associated with the user account.

7. The computer-implemented method as recited in claim 6, further comprising:

causing the offers for the delivery blocks to present in the user portal; and receiving, via the user portal, reservations for the offers for the delivery blocks.

8. The computer-implemented method as recited in claim 7, further comprising:

receiving user input to reserve a first offer of the offers for the delivery blocks; and determining to present remaining offers of the offers based at least in part on having a different time block.

9. The computer-implemented method as recited in claim 5, wherein the delivery data includes the second defect count associated with the station, and the one or more ML models output a predicted score for a second user account indicating a likelihood that the second user account will accept delivery offers from the station.

10. The computer-implemented method as recited in claim 9, wherein the one or more ML models use a distribution model based at least in part on the UDB defect rate associated with the station.

11. The computer-implemented method as recited in claim 10, further comprising:

determining third training data from second delivery data associated with a second station, the second delivery data including a third defect count associated with the second station; and determining, using the third training data, to retrain the one or more ML models to output a second predicted score for users associated with the second station.

12. The computer-implemented method as recited in claim 5, further comprising:

determining that the UDB score associated with the user account is equal to or greater than a fraud indication threshold; and determining, based at least in part on the UDB score being equal to or greater than the fraud indication threshold, to remove an access privilege from the user account.

13. The computer-implemented method as recited in claim 5, further comprising:

determining that the UDB score associated with the user account is equal to or greater than a notification threshold; and determining, based at least in part on the UDB score being equal to or greater than the notification threshold, to generate an email including advance instructions with additional delivery block information to arrive at the starting location for a reserved offer.

14. The computer-implemented method as recited in claim 5, further comprising:

determining a third number of routes for second delivery orders associated with the station; and determining, by applying a second predictive model to the third number of routes, a fourth number of offers for the delivery blocks, the fourth number of offers being greater than the third number of routes based at least in part on a historic defect rate associated with the station.

15. A system, comprising:

one or more processors; and memory storing computer-executable instructions that, when executed, cause the one or more processors to perform operations comprising:

generating one or more machine learning (ML) models using delivery data associated with a station for training data, wherein generating the one or more ML models includes:

determining, based on the training data, an aggregated route count for user accounts indicating Unassigned Delivery Block (UDB) counts associated with individual accounts of the user accounts;

determining, based on the training data, a UDB defect rate associated with the station; and determining, based on the aggregated route count and the UDB defect rate, a probability of accumulating UDB defects at the station;

determining, using the one or more ML models, individual UDB scores associated with the individual accounts of the user accounts indicating likelihood of intentional UDB defects, wherein the individual UDB scores are adjusted based on a weight associated with meeting a minimum block threshold;

determining, using the one or more (ML) models, a first number of offers for delivery blocks associated with a second number of routes from a station, the first number of the offers being greater than or equal to the second number of the routes, individual delivery blocks of the delivery blocks including a starting location, a starting time, an end time, and a payment;

receiving, from user devices, onsite confirmations for the delivery blocks, wherein the user devices include a first user device associated with a first user account and a second user device associated with a second user account;

determining, based at least in part on the onsite confirmations, to credit the payment associated with the individual delivery blocks to the first user account and the second user account;

transmitting, to the first user device, a route assignment from the routes;

determining that assignments for the second number of the routes is complete;

transmitting, to the second user device, a message to release the second user device from the station;

determining that a defect has occurred with respect to the second user account;

determining, based at least in part on the defect, to increase a first defect count associated with the second user account and a second defect count associated the station;

determining, using second training data, to retrain the one or more ML models, the second training data including at least a portion of the training data associated with the station and delivery data for the delivery blocks; and determining, using the one or more ML models after being retrained, a UDB score associated with the second user account, the UDB score indicating a probability that the second user account will accumulate one or more additional defects.

16. The system as recited in claim 15, wherein transmitting the message to release the second user device comprises:

determining that a predetermined time period has lapsed since the starting time; and determining, based at least in part on the predetermined time period having lapsed, to transmit the message to the second user device prior to the end time.

17. The system as recited in claim 15, wherein the user devices include a third user device associated with a third user account and the operations further comprise:

determining to credit the payment associated with the individual delivery blocks to the third user account;

transmitting, to the third user device, a second message to release the third user device from the station;

determining to increase a third defect count associated with the third user account; and determining, using the one or more ML models, a second UDB score associated with the third user account.

18. The system as recited in claim 17, the operations further comprising:

determining that the UDB score and the second UDB score are equal to or greater than a threshold; and determining, based at least in part on the UDB score and the UDB second score being equal to or greater than the threshold, to flag the second user account and the third user account.

19. The system as recited in claim 15, the operations further comprising:

receiving delivery metrics associated with the routes; and determining, based at least in part on the delivery metrics, to increase a driver score associated with the first user account based at least in part on the first user account completing the route assignment.

20. The system as recited in claim 19, the operations further comprising:

generating an offer for preferred delivery block associated with an order, the preferred delivery block associated with a priority service order and an increased payment for the preferred delivery block; and presenting the offer for the preferred delivery block to the first user device.

* * * * *